United States Patent
Scott

(10) Patent No.: US 7,999,790 B2
(45) Date of Patent: Aug. 16, 2011

(54) MULTI-FUNCTIONAL MISSION GRIP FOR A VEHICLE

(75) Inventor: Frank Scott, Breckenridge, CO (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1455 days.

(21) Appl. No.: 11/432,880

(22) Filed: May 12, 2006

(65) Prior Publication Data

US 2007/0262206 A1 Nov. 15, 2007

(51) Int. Cl.
*G09G 5/08* (2006.01)
*G09G 5/00* (2006.01)

(52) U.S. Cl. .......................................... 345/161; 345/184

(58) Field of Classification Search .................. 345/161, 345/156, 184, 157; 701/14, 211, 202, 206; 180/332, 333, 334
See application file for complete search history.

(56) References Cited

U.S. PATENT DOCUMENTS

| | | | | |
|---|---|---|---|---|
| 5,854,622 A | * | 12/1998 | Brannon | 345/161 |
| H1831 H | * | 2/2000 | Kelley et al. | 180/333 |
| 6,112,141 A | * | 8/2000 | Briffe et al. | 701/14 |
| 6,392,633 B1 | * | 5/2002 | Leiper | 345/161 |
| 6,433,772 B1 | * | 8/2002 | Krenz | 345/156 |
| 6,580,418 B1 | * | 6/2003 | Grome et al. | 345/161 |
| 6,591,308 B1 | * | 7/2003 | Cummings et al. | 345/156 |
| 6,903,652 B2 | * | 6/2005 | Noguchi et al. | 345/156 |
| 7,219,769 B2 | | 5/2007 | Yamanouchi et al. | |
| 7,246,567 B2 | | 7/2007 | Shelton et al. | |
| 2003/0172757 A1 | * | 9/2003 | Yone | 74/335 |
| 2007/0210901 A1 | | 9/2007 | Ahrens et al. | |
| 2007/0273207 A1 | | 11/2007 | Dorn et al. | |
| 2007/0281828 A1 | | 12/2007 | Rice | |

OTHER PUBLICATIONS

Mason Electric Company control grips printouts.
International Search Report and Written Opinion dated Jun. 17, 2008.

* cited by examiner

*Primary Examiner* — Kevin M Nguyen
(74) *Attorney, Agent, or Firm* — Carlson, Gaskey & Olds PC

(57) ABSTRACT

A mission control grip mounted to a consol to provide a crew interface with a multitude of systems through a multitude of Multi-Functional Displays (MFDs). The mission control grip includes a fist-shaped grip movable about a first axis and a second axis, a thumb-operated control switch and a switch for each finger. Even while steering one system the crewmember may still move a cursor to interact with that system modes/menu controls such as changing focus or magnitude on the MFD selected for the sensor system—or perform other tasks on another MFD not related to the MFD upon which the current system field of view is displayed.

32 Claims, 5 Drawing Sheets

MULTI-FUNCTIONAL MISSION GRIP FOR A VEHICLE

BACKGROUND OF THE INVENTION

The present invention relates to a mission control grip for a vehicle, and more particularly to a mission control grip which permits a crewmember to simultaneously interface with a multiple of systems through a multiple of Multi-Function Displays.

Various vehicles which operate in adverse non-stable conditions locate various vehicle control, weapon system and sensor system switches on controllers (commonly known as "grips"). Many fixed wing aircraft, rotary-wing aircraft, ground vehicles, sea vehicles and simulators, utilize such grips as crew interfaces.

Aircraft have commonly utilized HOTAS (Hands On Throttle And Stick) control to increase crew efficiency. Fly-by-wire aircraft are extremely responsive to small control inputs. In some conditions, the crewmember not flying the aircraft (i.e., the "non-pilot" crewmember) may not be able to make HOTAS switch inputs without interfering with aircraft operation. As such, some vehicles dedicate large amounts of control consol space to replicate the grip switches. However, in many vehicles such as military rotorcraft which may have relatively small cockpits with numerous Multi-Function Displays (MFDs), the amount of available control consol space for mounting duplicate or additional flight control, weapons control and sensor system switches may be restricted.

Other vehicles may utilize "mission grips" which do not directly control the vehicle but control weapon and sensor systems. The mission grip is a fixed grip that includes a multitude of switches which permits a crewmember to control a weapon or sensor system without interfering with vehicle operation.

One disadvantage of the mission grip is that the movable control switch on the fixed mission grip—which nominally controls the cursor on a MFD—must be switched over to steer a sensor system such as a FLIR system turret. When this occurs, the disabled cursor cannot be moved on that MFD without either a secondary mouse/cursor controller or relinquishing steering of the FLIR turret. The crewmember therefore can only operate the cursor or steer the FLIR—not both. Furthermore, operation of the control switch may not coincide with a crewmember's intuitive expectation of how the control switch will steer the sensor field view. These control interface limitations may therefore result in reduced crew efficiency.

Accordingly, it is desirable to provide a mission grip with increased functionality.

SUMMARY OF THE INVENTION

A mission control grip according to the present invention is mounted to a consol to provide a crew interface between the crewmember and a multitude of systems through a multitude of Multi-functional Displays MFDs. The mission control grip includes a fist-shaped grip movable about a first axis and a second axis. The fist-shaped grip is ergonomically shaped for either left-hand or right-hand operation depending on the expected control consol mounting location. The grip locates a thumb-operated control switch for operation by the crewmember's thumb and a switch for each finger when the fist-shaped grip is grasped. Such ergonomic shaping not only readily positions the thumb-operated control switch and switches but also facilitates operations by a crewmember in a rough/turbulent/vibrating environment.

The mission control grip can simultaneously control at least two of a multitude of systems utilizing a combination of MFDs in a simultaneous manner. Typical employment would be in the control of a field of view of a directional sensor such as the FLIR, RADAR, or daylight camera system on one MFD while manipulating a cursor on a second MFD. The mission control grip thereby maintains full functionality which enables a crewmember to move a cursor on any of a multiple of MFDs with the thumb-operated switch to perform various tasks while maintaining solid control of the fist-shaped grip in rough/turbulent/vibrating conditions to simultaneously steer the sensor system therewith. The control inputs of the mission control grip are compatible with the crewmember's intuitive expectation of how the control will effect the sensor system movement as, for example only, if the crewmember wants to steer a FLIR to the right the fist-shaped grip need only be twisted right. Even while steering one sensor system the crewmember may still use the cursor to interact with that sensor system modes/menu controls such as changing focus or magnitude on the MFD selected for the sensor system. The crewmember can also perform other tasks on another MFD not related to the MFD upon which the current sensor system field of view is displayed. Crew efficiency is thereby increased.

The present invention therefore provides a mission grip with increased functionality.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
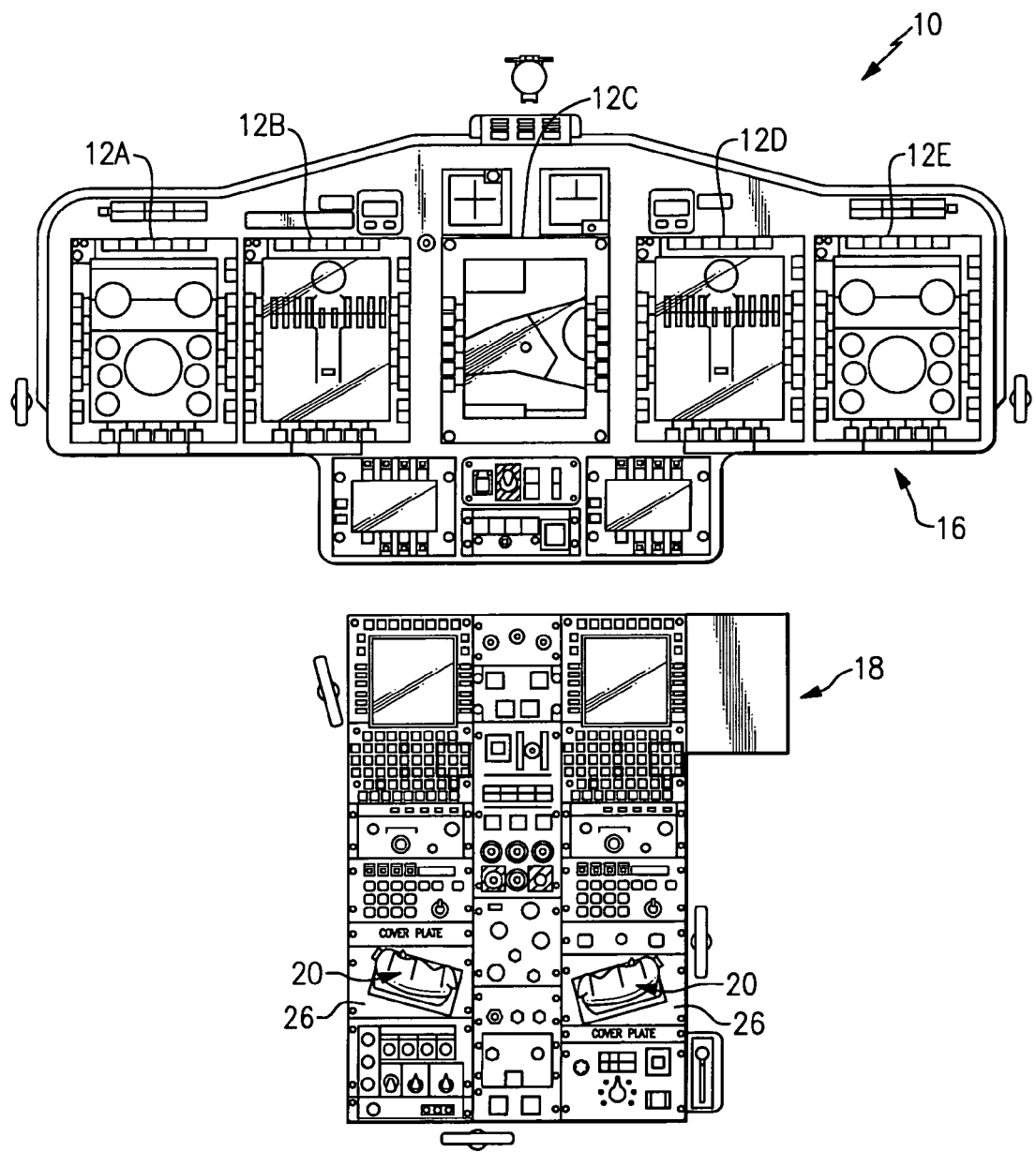
FIG. 1A is a general perspective view an exemplary rotary wing aircraft cockpit.
Figure 1B:
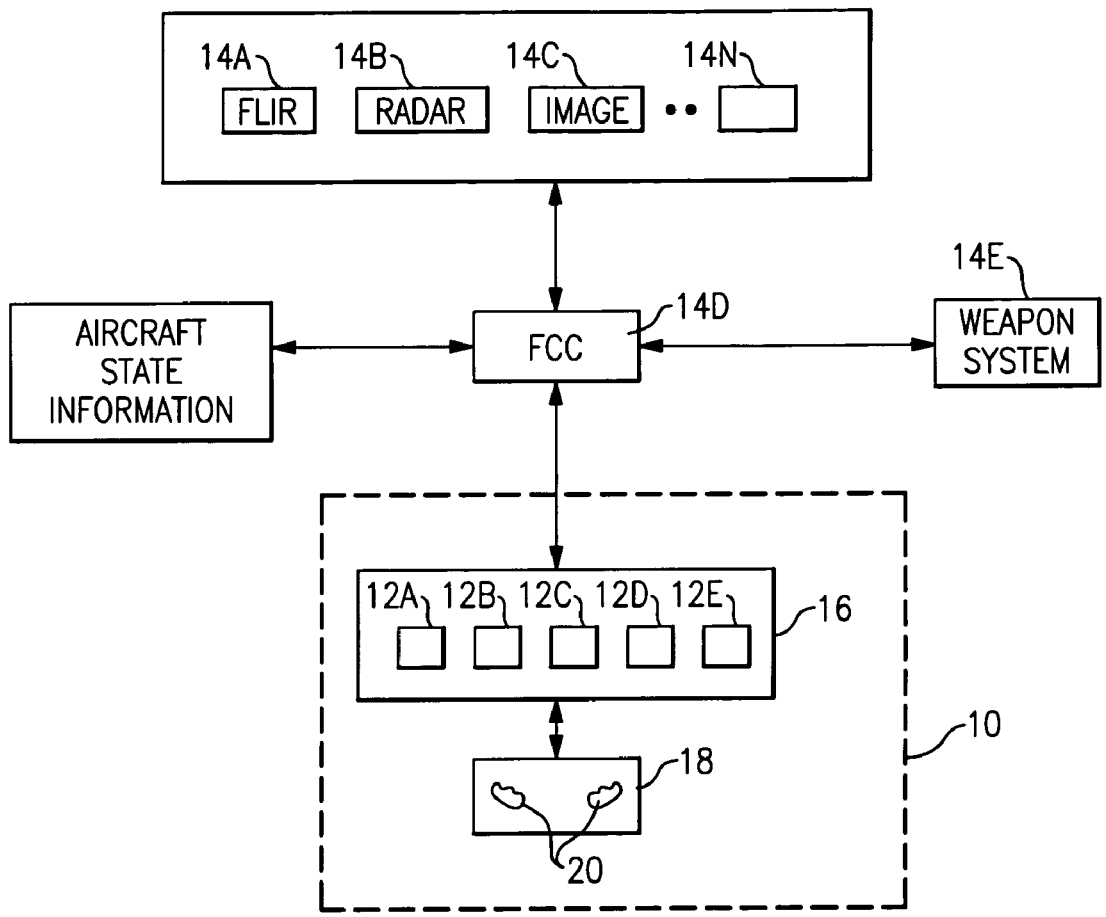
FIG. 1B is a block diagram of a user interface for a vehicle.

FIG. 1A illustrates a general perspective view of a vehicle cockpit 10. The cockpit 10 includes a multitude of multi-functional displays (MFDs) 12A-12E which are selectively operable to display information from various vehicle systems. The systems may include, for example only, a Forward Looking Infrared (FLIR) 14A, a radar system 14B, a daylight image system 14C, a flight control computer (FCC) 14D as well as others (FIG. 1B). Data and imagery from the systems 14A-14C may be selectively displayed on one or more to the MFDs 12A-12E. The MFDs 12A-12E may be mounted in the instrument panel 16 as well as a center consol 18. It should be understood that although a particular cockpit arrangement is disclosed in the illustrated embodiment, other arrangements for other air, ground and sea based vehicles will benefit herefrom.

A mission control grip 20 is mounted to the center consol 18 to provide a crew interface system between the crewmember and the systems 14A-14D through the operational display on the MFDs 12A-12E. It should be understood that although the mission control grip 20 is illustrated as installed in the center consol 18—one for the pilot and one for the co-pilot (also shown in FIGS. 2A and 2B)—the mission control grip 20 may be mounted in various locations depending on the particular vehicle and crew location and is not to be limited to only the location illustrated in the disclosed embodiment. For example, the mission control grip 20 may be located in a significantly different position and orientation should the mission control grip be utilized within a ground vehicle, fixed-wing aircraft, or sea vehicle rather than a rotary wing aircraft.

Figure 2A:
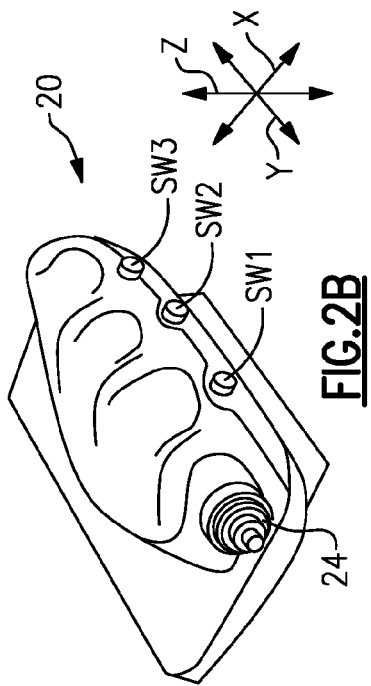
FIG. 2A is a perspective view of a RH mission control grip.
Figure 2B:
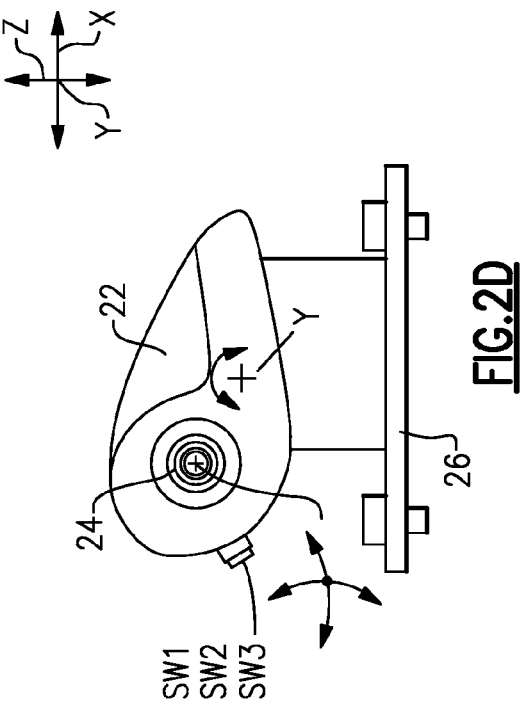
FIG. 2B is a perspective view of a LH mission control grip.
Figure 2C:
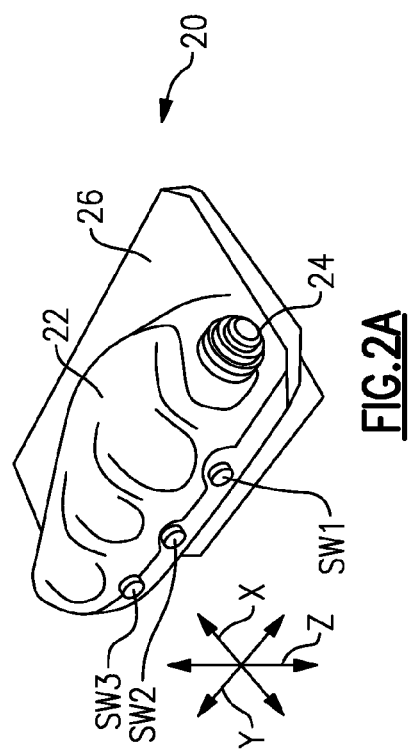
FIG. 2C is a top view of a RH mission control grip.
Figure 2D:
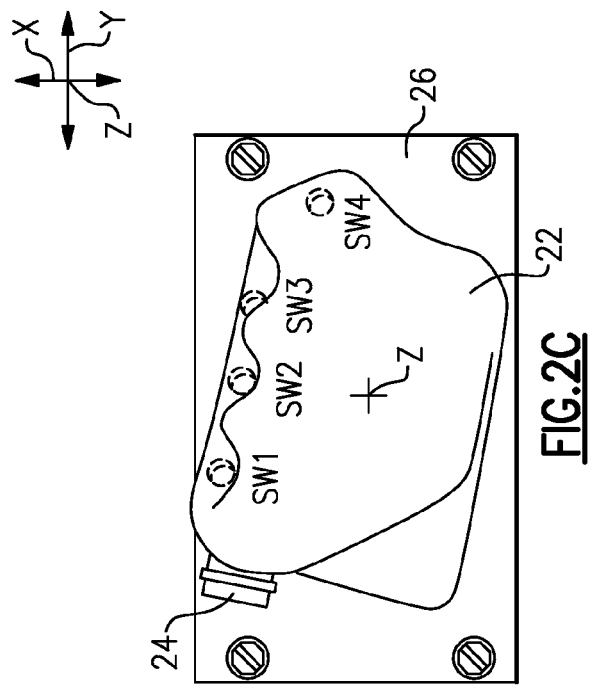
FIG. 2D is a side view of a RH mission control grip.

Referring to FIG. 2A, the mission control grip 20 includes a fist-shaped grip 22 movable about a first axis (FIG. 2C) and a second axis (FIG. 2D). The first axis FIG. 2C) is preferably a Z-axis about which the mission control grip 20 may be twisted. The second axis (FIG. 2D) is preferably an X-axis about which the mission control grip 20 may be articulated fore and aft as illustrated by the double headed arrow. The mission control grip 20 is mounted to a plate 26 which permits the mission control grip 20 to be mounted as a line replaceable unit into a cockpit consol (FIG. 1A).

The fist-shaped in that the fist-shaped grip 22 is ergonomically shaped for either right-hand (FIG. 2A) or left-hand (FIG. 2B) operation depending on the expected control consol mounting location (FIG. 1A). The fist-shaped grip 22 locates a thumb-operated control switch 24 in position for operation by the crewmember's thumb and a switch SW1-SW4 for each finger when the fist-shaped grip 22 is grasped. Such ergonomic shaping not only readily positions the thumb-operated control switch 24 and switches SW1-SW4 but also facilitates operations by a crewmember in a rough/turbulent/vibrating environment not available with a conventional joystick or trackball controls. It should be noted that the fist-shaped grip 22 requires only relatively small movements to provide the steering functionality which further facilitates operations by a crewmember in rough/turbulent/vibrating environments. The thumb-operated control switch 24 is preferably a four-way switch, however, other type switches, and the like with other functionality may alternatively be located in this position.

Figure 3A:
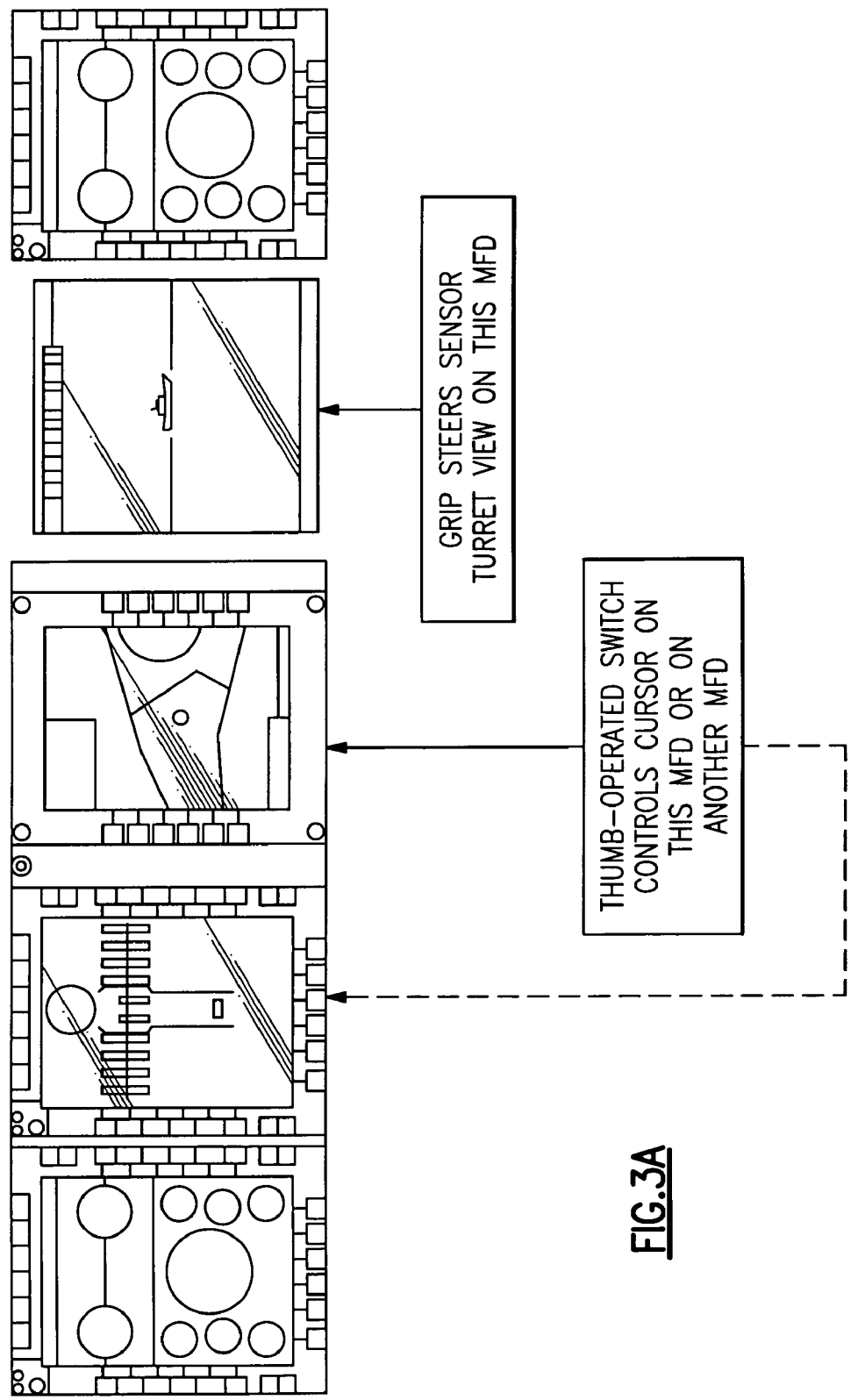
FIG. 3A is schematic representation of a set of MFDs illustrating usage of a mission control grip to steer a sensor system through a first multi-function display while controlling a cursor on another multi-function display(s)

The mission control grip 20 is preferably employed to simultaneously control at least two of the multitude of systems 14A-14E utilizing two of the MFDs 12A-12E in a simultaneous manner. Typical employment would be in the control of a field of view of a directional sensor such as the FLIR, RADAR, or daylight image system on one MFD while manipulating a cursor on a second MFD (FIG. 3A). The mission control grip 20 thereby maintains full functionality which enables a crewmember to move a cursor on any of a multiple of MFDs with the thumb-operated control switch 24 to perform various tasks while maintaining solid control of the fist-shaped grip 22 in rough/turbulent/vibrating conditions to simultaneously steer the system therewith. The control inputs of the mission control grip 20 are compatible with the crewmember's intuitive expectation of how the control will steer the system movement as, for example only, if the crewmember wants to steer a FLIR to the right the fist-shaped grip 22 need only be twisted right.

Figure 3B:
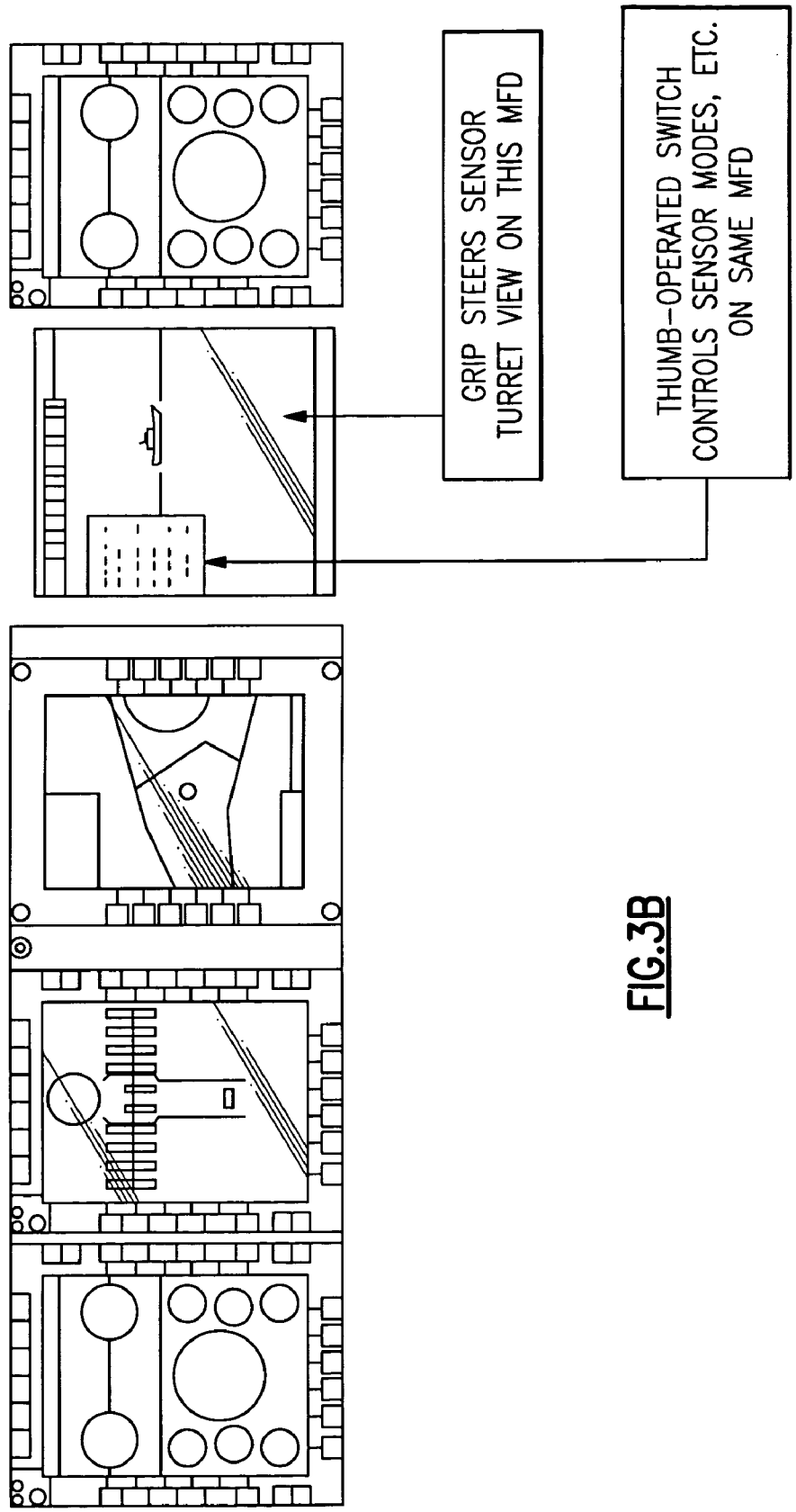
FIG. 3B is schematic representation of a set of MFDs illustrating usage of a mission control grip showing steerage of a sensor system in combination with mode control of the sensor system on a single multi-function display.

The switches SW1-SW4 preferably select between various MFDs such that the thumb-operated control switch 24 cursor operation is thereby associated with that MFD. Alternatively, or in addition thereto, the switches SW1-SW4 select between systems 14A-14E such that the fist-shaped grip 22 will then steer that weapon or sensor system. Even while steering one sensor system the crewmember may still use the cursor to interact with that system modes/menu controls such as changing focus or magnitude on the MFD selected for that sensor system (FIG. 3B) or perform other tasks on another MFD not related to the MFD upon which the current sensor system field of view is displayed (FIG. 3A). Crew efficiency is thereby increased.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A control consol comprising:
   a fist-shaped grip fixed about a Y-axis, said fist shaped grip movable about a Z-axis and an X-axis, said Z-axis extends through a plate which supports said fist-shaped grip such that a palm of a user is directed toward said plate when said fist-shaped grip is grasped by the user.

2. The control consol as recited in claim 1, further comprising four finger-operated switches located on said fist-shaped grip.

3. The control consol as recited in claim 1, wherein said plate is mountable within a vehicle cockpit.

4. The control consol as recited in claim 1, wherein said plate is mountable-within a simulator.

5. The control consol as recited in claim 1, further comprising a thumb-operated control switch mounted to said fist-shaped grip.

6. The control consol as recited in claim 5, wherein said thumb-operated control switch is a four-way switch.

7. The control consol as recited in claim 1, further comprising four finger-operated switches mounted to said fist-shaped grip generally along said Y- axis.

8. The control consol as recited in claim 7, wherein said fist-shaped grip extends generally along said Y-axis.

9. The control consol as recited in claim 1, wherein said fist-shaped grip extends generally along said Y-axis.

10. The control consol as recited in claim 1, wherein said fist-shaped grip is pivotable about said Z-axis and movable generally along said X-axis about said Y-axis.

11. The control consol as recited in claim 1, wherein said fist-shaped grip is right-handed.

12. The control consol as recited in claim 1, wherein said fist-shaped grip is left-handed.

13. The control consol as recited in claim 1, further comprising a thumb-operated control switch mounted to said fist-shaped grip and four finger- operated switches mounted to said fist-shaped grip to intercept an X-Y plane.

14. The control consol as recited in claim 1, wherein said plate at least partially defines a line replaceable unit.

15. A crew-interface system comprising:
    a first multi-function display;

a second multi-function display;

a consol;

a fist-shaped grip fixed about a Y-axis, said fist-shaped grip movable about a Z-axis and an X-axis to control a first system through at least one of said first multi-function display and said second multi-function display, said Z-axis extends through a plate which supports said fist-shaped grip on said consol such that a palm of a user is directed toward said plate when said fist-shaped grip is grasped by the user; and a thumb-operated control switch mounted to said fist-shaped grip to selectively control a second system through at least one of said first multi-function display and said second multi-function display.

16. The system as recited in claim 15, wherein said thumb-operated control switch is a 4-way switch.

17. The system as recited in claim 15, wherein said consol is a center consol within a vehicle cockpit.

18. The system as recited in claim 15, wherein said first system includes one of a FLIR system, a radar system or any imagery system.

19. The system as recited in claim 18, wherein said second system includes a movable cursor.

20. A method of controlling a multiple of systems comprising the steps of:
    (A) locating a fist-shaped grip on a consol, the fist-shaped grip movable about a Z- axis and an X-axis, and fixed about a Y-axis, the Z-axis extends through a plate which supports the fist-shaped grip on the consol such that a palm of a user is directed toward the plate when the fist-shaped grip is grasped by the use;
    (B) manipulating the fist-shaped grip to control a first system ; and
    (C) manipulating a thumb-operated control switch on the fist-shaped grip to selectively control a second system.

21. A method as recited in claim 20, wherein said step (B) further comprises:
    (a) manipulating the fist-shaped grip in said Z-axis and said X-axis; and
    (b) steering a sensor system in response to said step (a).

22. A method as recited in claim 21, wherein said step (C) further comprises:
    (c) manipulating the thumb-operated control switch; and
    (d) moving a cursor in response to said step (c).

23. A method as recited in claim 22, wherein said step (C) further comprises:
    (e) operating a mode of the sensor system in response to said step (d).

24. A method as recited in claim 20, further comprising the steps of:
    (a) manipulating the fist-shaped grip;
    (b) steering a sensor system in response to said step (a);
    (c) displaying the field of view from the sensor system on at least one of a first multi-function display and a second multi-function display
    (d) manipulating the thumb-operated control switch; and
    (e) moving a cursor on at least one of a first multi-function display and a second multi-function display in response to said step (d).

25. A method as recited in claim 20, further comprising the steps of:
    (a) manipulating the fist-shaped grip;
    (b) moving a cursor on at least one of a first multi-function display and a second multi-function display in response to said step (a). (c) manipulating the thumb-operated control switch;
    (d) steering a sensor system in response to said step (c); and
    (e) displaying the field of view from the sensor system.

26. A method as recited in claim 20, wherein said step (B) further comprises:
    (a) manipulating the fist-shaped grip in said Z-axis and said X-axis; and
    (b) steering a sensor system in response to said step (a) on a first multi- function display.

27. A method as recited in claim 26, wherein said step (C) further comprises:
    (c) manipulating the thumb-operated control switch; and
    (d) moving a cursor in response to said step (c) on the first multi-function display.

28. A method as recited in claim 26, wherein said step (C) further comprises:
    (c) manipulating the thumb-operated control switch; and
    (d) moving a cursor in response to said step (c) on a second multi-function display.

29. A method as recited in claim 20, further comprising the steps of:
    selecting between various multi-function displays with four finger-operated switches mounted to the fist-'shaped grip generally along said Y-axis such that operation of the thumb- operated control switch is associated with the selected multi-function display.

30. A method as recited in claim 20, further comprising the steps of:
    selecting between various multi-function displays with four finger-operated switches mounted to the fist-shaped grip generally along said Y-axis such that operation of the fist-shaped grip is associated with the selected multi-function display.

31. A method as recited in claim 20, further comprising the steps of:
    selecting between various systems with four finger-operated switches mounted to the fist- shaped grip generally along said Y-axis such that the fist-shaped grip is associated with the selected system.

32. A method as recited in claim 20, further comprising the steps of:
    selecting between various systems with four finger-operated switches mounted to the fist- shaped grip generally along said Y-axis such that the thumb-operated control switch is associated with the selected system.

* * * * *